(12) United States Patent
Caiafa et al.

(10) Patent No.: US 10,692,684 B2
(45) Date of Patent: Jun. 23, 2020

(54) ELECTRONIC CONTROL FOR HIGH VOLTAGE SYSTEMS

(71) Applicant: General Electric Company, Schenectady, NY (US)

(72) Inventors: Antonio Caiafa, Albany, NY (US); Philippe Ernest, Buc (FR); Dominique Poincloux, Buc (FR)

(73) Assignee: General Electric Company, Schenectady, NY (US)

( * ) Notice: Subject to any disclaimer, the term of this patent is extended or adjusted under 35 U.S.C. 154(b) by 517 days.

(21) Appl. No.: 15/377,539

(22) Filed: Dec. 13, 2016

(65) Prior Publication Data

US 2017/0171954 A1 Jun. 15, 2017

Related U.S. Application Data

(60) Provisional application No. 62/266,836, filed on Dec. 14, 2015.

(51) Int. Cl.
| | |
|---|---|
| *H01J 35/08* | (2006.01) |
| *H02H 9/04* | (2006.01) |
| *H05G 1/34* | (2006.01) |
| *H05G 1/54* | (2006.01) |

(52) U.S. Cl.
CPC ............ *H01J 35/08* (2013.01); *H02H 9/042* (2013.01); *H02H 9/043* (2013.01); *H05G 1/34* (2013.01); *H05G 1/54* (2013.01)

(58) Field of Classification Search
CPC ......... H01J 35/08; H02H 9/043; H02H 9/042; H05G 1/34; H05G 1/54; H05G 1/56; H05G 1/66
See application file for complete search history.

(56) References Cited

U.S. PATENT DOCUMENTS

| | | | | |
|---|---|---|---|---|
| 4,402,086 | A * | 8/1983 | Setbon | H05G 1/54 378/105 |
| 4,967,333 | A * | 10/1990 | Callier | H02M 3/28 363/17 |
| 5,265,146 | A * | 11/1993 | Wirth | H05G 1/66 378/101 |
| 5,335,161 | A * | 8/1994 | Pellegrino | H02M 7/106 363/61 |
| 5,339,348 | A * | 8/1994 | Wirth | H05G 1/20 378/91 |

(Continued)

FOREIGN PATENT DOCUMENTS

WO 2015016117 A1 2/2015

*Primary Examiner* — David J Makiya
*Assistant Examiner* — Soorena Kefayati

(57) ABSTRACT

A circuit assembly includes plural voltage control modules configured to be operably coupled in series to a connection and configured to control voltage delivered to an X-ray electrode. Each voltage module includes an on/off circuit portion, a balancing circuit portion, and a tuning circuit portion. The on/off circuit portion is configured to provide a voltage for activating or deactivating the X-ray electrode. The balancing circuit portion is coupled in parallel to the on/off circuit portion, and includes a capacitor and a resistor coupled in parallel. The tuning circuit portion is coupled in parallel to the balancing circuit portion and the on/off circuit portion, and is configured to adjust a voltage provided to the X-ray electrode.

11 Claims, 13 Drawing Sheets

(56) References Cited

U.S. PATENT DOCUMENTS

| | | | |
|---|---|---|---|
| 5,511,105 A | 4/1996 | Knott | |
| 5,629,844 A * | 5/1997 | Krichtafovitch | B03C 3/68 363/15 |
| 5,661,774 A * | 8/1997 | Gordon | G01N 23/046 378/101 |
| 5,966,425 A * | 10/1999 | Beland | H02M 7/1557 378/108 |
| 6,181,771 B1 | 1/2001 | Hell et al. | |
| 6,351,401 B1 * | 2/2002 | Scheel | H02M 3/3376 323/901 |
| 6,477,062 B1 * | 11/2002 | Wagner | H02M 3/158 363/17 |
| 6,917,531 B2 * | 7/2005 | Scheel | H02M 7/5236 363/21.02 |
| 7,327,827 B2 * | 2/2008 | Sakamoto | H05G 1/12 378/101 |
| 7,400,708 B2 * | 7/2008 | Takahashi | H05G 1/10 378/101 |
| 7,522,705 B2 * | 4/2009 | Katcha | A61B 6/032 378/102 |
| 7,949,102 B2 | 5/2011 | Behling | |
| 8,189,741 B2 * | 5/2012 | Ernest | H05G 1/58 378/103 |
| 8,441,812 B2 * | 5/2013 | Ueno | H02M 3/337 363/16 |
| 8,457,282 B2 | 6/2013 | Ren et al. | |
| 8,767,911 B2 | 7/2014 | Ren et al. | |
| 2005/0147148 A1 * | 7/2005 | Eichholz | B82Y 10/00 372/74 |
| 2008/0089482 A1 * | 4/2008 | Soto | H03K 17/102 378/101 |
| 2009/0185661 A1 | 7/2009 | Zou et al. | |
| 2009/0316859 A1 * | 12/2009 | Iijima | H05G 1/12 378/110 |
| 2011/0002446 A1 * | 1/2011 | Beland | H05G 1/10 378/111 |
| 2012/0155613 A1 * | 6/2012 | Caiafa | H02M 3/337 378/111 |
| 2013/0128398 A1 * | 5/2013 | Wang | H02H 9/04 361/56 |
| 2014/0056411 A1 * | 2/2014 | Roos | H05G 1/12 378/109 |
| 2014/0169530 A1 | 6/2014 | Frontera et al. | |
| 2014/0185774 A1 * | 7/2014 | Wang | H05G 1/10 378/104 |
| 2015/0049857 A1 | 2/2015 | Wiedmann | |
| 2015/0110251 A1 * | 4/2015 | Wiedmann | H01J 35/14 378/138 |
| 2015/0207449 A1 * | 7/2015 | Clendenen | H02P 29/0241 318/400.22 |
| 2015/0229121 A1 * | 8/2015 | Davidson | H03K 17/0828 361/54 |
| 2016/0021726 A1 * | 1/2016 | Seo | H05G 1/32 378/104 |
| 2016/0143120 A1 * | 5/2016 | Shindo | H05G 1/66 378/93 |
| 2017/0318653 A1 * | 11/2017 | Yuasa | H05G 1/58 |
| 2018/0337613 A1 * | 11/2018 | Luerkens | H02M 1/12 |

* cited by examiner

ELECTRONIC CONTROL FOR HIGH VOLTAGE SYSTEMS

CROSS-REFERENCE TO RELATED APPLICATIONS

This application claims priority to U.S. Application No. 62/266,836, entitled "Electronic Control for High Voltage Systems," filed 14 Dec. 2015, the entire disclosure of which is incorporated herein by reference.

FIELD

Embodiments of the subject matter described herein relate to circuit assemblies, such as circuits that protect components connected with high voltage systems, such as interventional X-ray systems.

BACKGROUND

Some powered systems are supplied with high voltages to perform various operations, such as interventional X-ray systems. These types of systems may receive high voltages. Additionally, voltages may have to be switched over a range of several kilovolts in a relatively short amount of time (e.g., 50 microseconds or less). Control units such as gate drivers other sensitive electronics may be used to control the supply of voltage to the powered systems. However, such control units may be susceptible to damage when subject to such rapidly changing voltages. Accordingly, such units may use oversized and/or expensive electronic components.

Operation of interventional tubes, for example, may require an electron beam transition from on to off and/or off to one to be relatively fast (within microseconds), despite a relatively small overall frequency of operation. A precise voltage may be required to provide a sufficiently tight focal spot size. The focal spot size may vary according to patient size, type of exam, or the like.

BRIEF DESCRIPTION

In one embodiment, a circuit assembly is provided that includes plural voltage control modules configured to be operably coupled (e.g., in series) to a connection and configured to control voltage delivered to an X-ray electrode. Each voltage module includes an on/off circuit portion, a balancing circuit portion, and a fine-tuning circuit portion. The on/off circuit portion is configured to provide a voltage for activating or deactivating the X-ray electrode. The balancing circuit portion is coupled in parallel to the on/off circuit portion, and includes a capacitor and a resistor coupled in parallel. The fine-tuning circuit portion is coupled in parallel to the balancing circuit portion and the on/off circuit portion, and is configured to adjust a voltage provided to the X-ray electrode.

In another embodiment, a system is provided that includes at least one X-ray electrode, a controller, a connection, and plural voltage control modules. The controller is configured to control at least one voltage provided to the at least one X-ray electrode. The connection is interposed between the controller and the at least one X-ray electrode. The voltage control modules are configured to be operably coupled (e.g., in series) to the connection and to control the at least one voltage delivered to the at least one X-ray electrode.

In another embodiment, a system is provided that includes at least one X-ray electrode, a controller, a connection, and plural voltage control modules. The controller is configured to control at least one voltage provided to the at least one X-ray electrode. The connection is interposed between the controller and the at least one X-ray electrode. The voltage control modules are configured to be operably coupled (e.g., in series) to the connection and to control the at least one voltage delivered to the at least one X-ray electrode. Each voltage control module includes an on/off circuit portion configured to provide a voltage for activating or deactivating the at least one X-ray electrode, a balancing circuit portion coupled in parallel to the on/off circuit portion, with the balancing portion including a capacitor and a resistor coupled in parallel, and a fine-tuning circuit portion. The fine-tuning circuit portion is coupled in parallel to the balancing circuit portion and the on/off circuit portion, and is configured to adjust the at least one voltage provided to the at least one X-ray electrode.

BRIEF DESCRIPTION OF THE DRAWINGS

The subject matter described herein may be understood from reading the following description of non-limiting embodiments, with reference to the attached drawings, wherein.

DETAILED DESCRIPTION

One or more embodiments of the inventive subject matter described herein relate to circuit assemblies and methods that provide for relatively large voltage swings in relatively short amounts of time, which may be used to provide a voltage to a target that may be a relatively large distance (e.g., 30 meters) from control electronics, using relatively inexpensive, generally available electronic components.

These systems can include, by way of example, interventional X-ray systems, or other types of high voltage systems.

Figure 1:
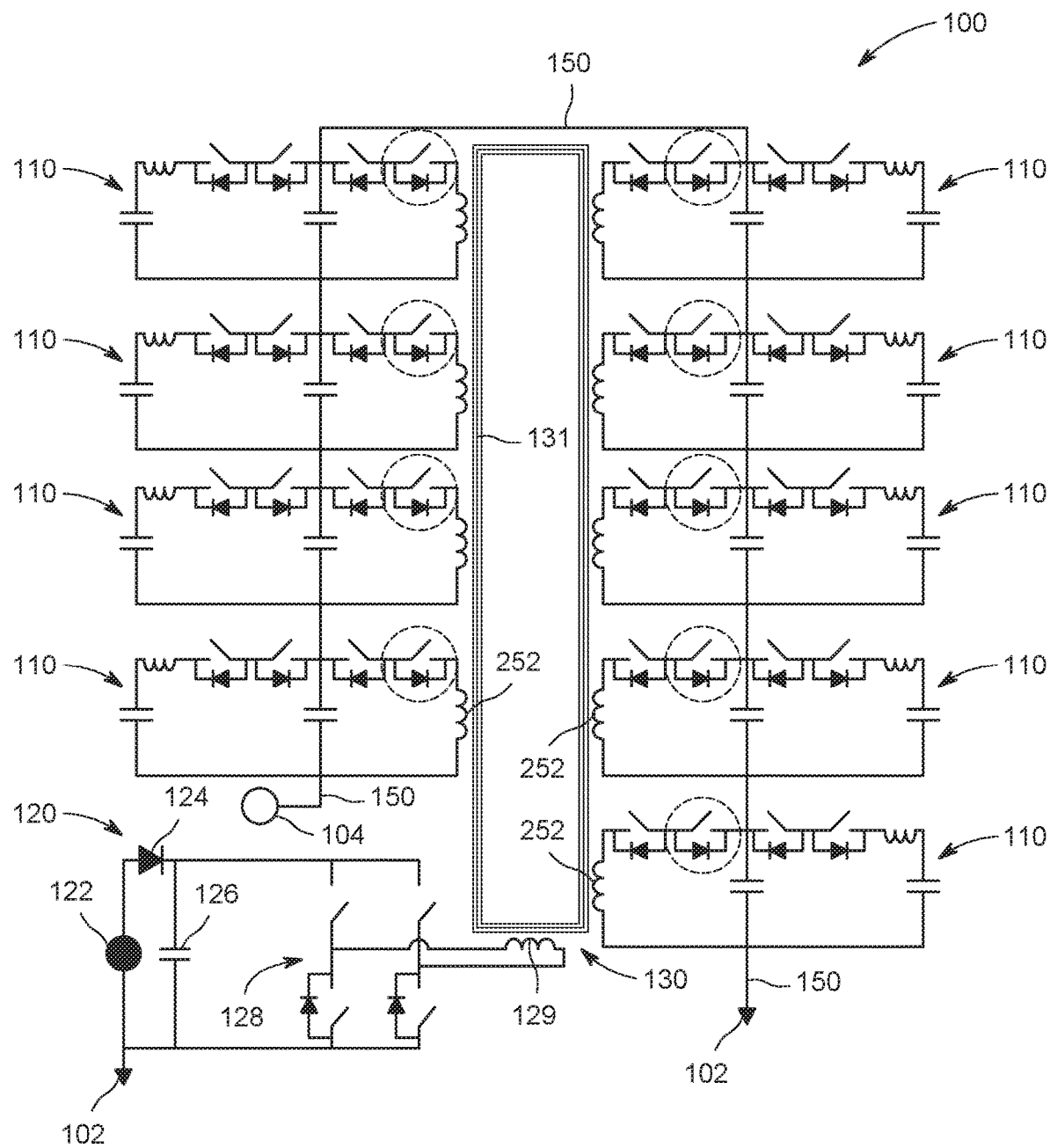
FIG. 1 is a schematic depiction of a circuit assembly for controlling voltage provided to a connection in accordance with various embodiments.
Figure 2:
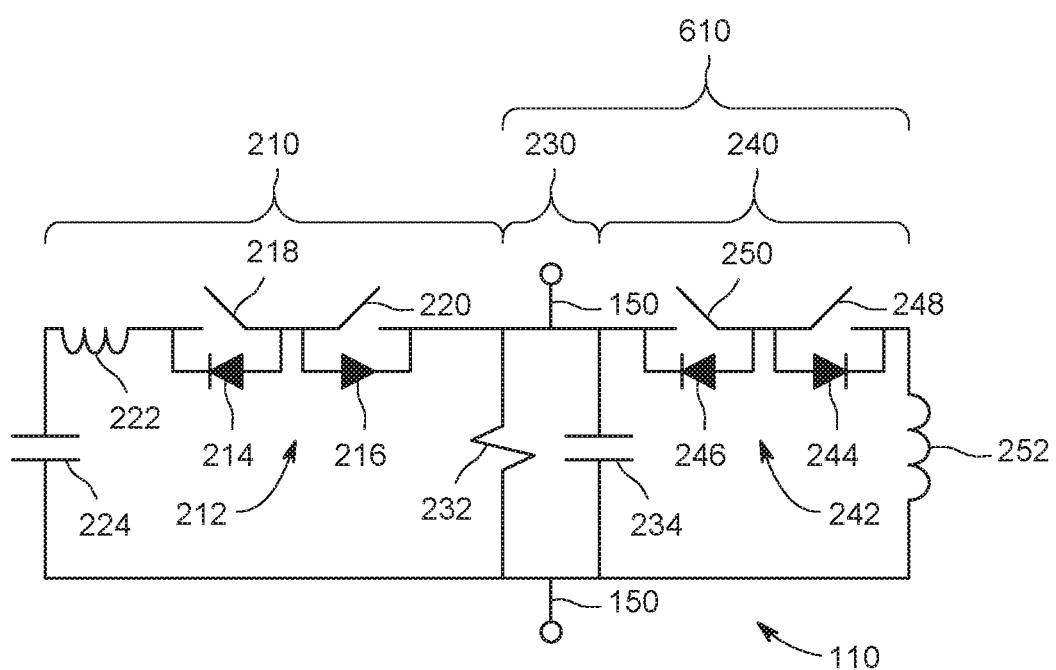
FIG. 2 is a schematic depiction of a voltage control module of the system of FIG. 1.

FIG. 1 illustrates one embodiment of a circuit assembly 100 for controlling voltage provided to a connection 150. The embodiment depicted in FIG. 1 includes plural voltage control modules 110 that are operably coupled to the connection 150, as well as a low voltage circuit portion 120 coupled to the connection 150. It may be noted that voltage control modules as discussed herein define circuits or portions thereof. The voltage control modules 110 are configured to control a voltage delivered to a target (such as an X-ray electrode). By combining the voltage control modules in series, the total voltage handled by any given voltage control module, as well as the components of the voltage control modules, may be limited to values that allow use of readily available, relatively inexpensive components, while still delivering a relatively large total or combined voltage to a target, such as an X-ray electrode. For example, with 9 voltage control modules 110 as shown in FIG. 1, if the components (e.g., switches) of each voltage control module are rated for 1.2 kV, than a total combined voltage delivered to the target of 10.8 kV is theoretically possible. As best seen in FIG. 2, each voltage control module 110 includes an on/off circuit portion 210, a balancing circuit portion 230, and a fine-tuning circuit portion 240. In the depicted embodiment, the on/off circuit portion 210, balancing circuit portion 230, and fine-tuning circuit portion 240 of each voltage control module 110 are arranged in parallel to each other and coupled to the connection 150 (e.g., to a conductor or wire of the connection 150).

Generally, the on/off circuit portion 210 is configured to provide a voltage for activating or deactivating the target (e.g., X-ray electrode). For example, a relatively quick change in total voltage may be delivered to the target. In some embodiments, a total delivered voltage may be changed from −6 kV to 2.5 kV in less than 50 microseconds to turn on or activate an X ray electrode. Similarly, the total delivered voltage may be changed from 2.5 kV to −6 kV in less than 50 microseconds to turn off or deactivate an X ray electrode. It may be noted that the above values are provided by way of example, and other voltages may be used to activate or deactivate a target in other embodiments. The fine-tuning circuit portion 240 is coupled in parallel to the balancing circuit portion 230 and the on/off circuit portion 210, and is configured to adjust a voltage delivered to the target (e.g., X-ray electrode). In the illustrated embodiment, the on/off circuit portions of the voltage control module 110 may be utilized to provide relatively large voltage swings in short periods of time, while the fine-tuning circuit portions may be utilized to provide smaller voltage changes (e.g., to adjust or focus an electron beam by adjusting the voltage to one or more X-ray electrodes). In various embodiments, the on/off circuit portion 210 may utilize or include one or more passive gate drives, while the fine-tuning circuit portion 240 may include an active gate drive. The voltage provided by a given voltage control module 110 may be controlled by opening and closing a conductive pathway using an active gate drive of the fine-tuning circuit portion 240 based on a measured or otherwise determined voltage delivered via the connection 150.

As seen in FIG. 1, the connection 150 extends from a common 102 to a target 104. It may be noted that the common 102 is depicted at two different points in FIG. 1, and is coupled to both the low voltage circuit portion 120 as well as a voltage control module 110 via the connection 150. As the connection 150 extends from the common 102 to the target 104, the voltage control modules 110 are coupled to the connection 150. It may be noted that the connection 150 is depicted schematically in FIG. 1. In various embodiments, the target 104 (e.g., an X-ray electrode) may be located at a relatively large distance from the voltage control modules 110, for example up to 30 meters in some embodiments. The target 104, for example, may lead to a cable that is coupled to an X-ray electrode to provide a signal to the X-ray electrode.

As also seen in FIG. 1, the circuit assembly 100 also includes a transformer 130. The transformer 130 is operably coupled to the low voltage circuit portion 120 and to the voltage control modules 110. In the illustrated embodiment, the transformer 130 transfers electrical energy between the low voltage circuit portion 120 and the voltage control modules 110 via electrical induction. For example, a relatively low voltage provided by the low voltage circuit portion 120 (e.g., 48 volts) may be used to provide a relatively high voltage to the voltage control modules 110 (e.g., 1.2 kV each). The depicted transformer 130 includes a body 131, which may be a magnetic structure about which various windings are disposed to transfer energy between the low voltage circuit portion 120 and the voltage control modules. For example, an inductor 129 of the low voltage circuit portion 120 may inductively couple the low voltage circuit portion 120 to the transformer 130, and be understood as a primary winding. Similarly, inductors 252 of the voltage control modules 110 may inductively couple the voltage control modules 110 to the transformer 130, and be understood as secondary windings.

Figure 3:
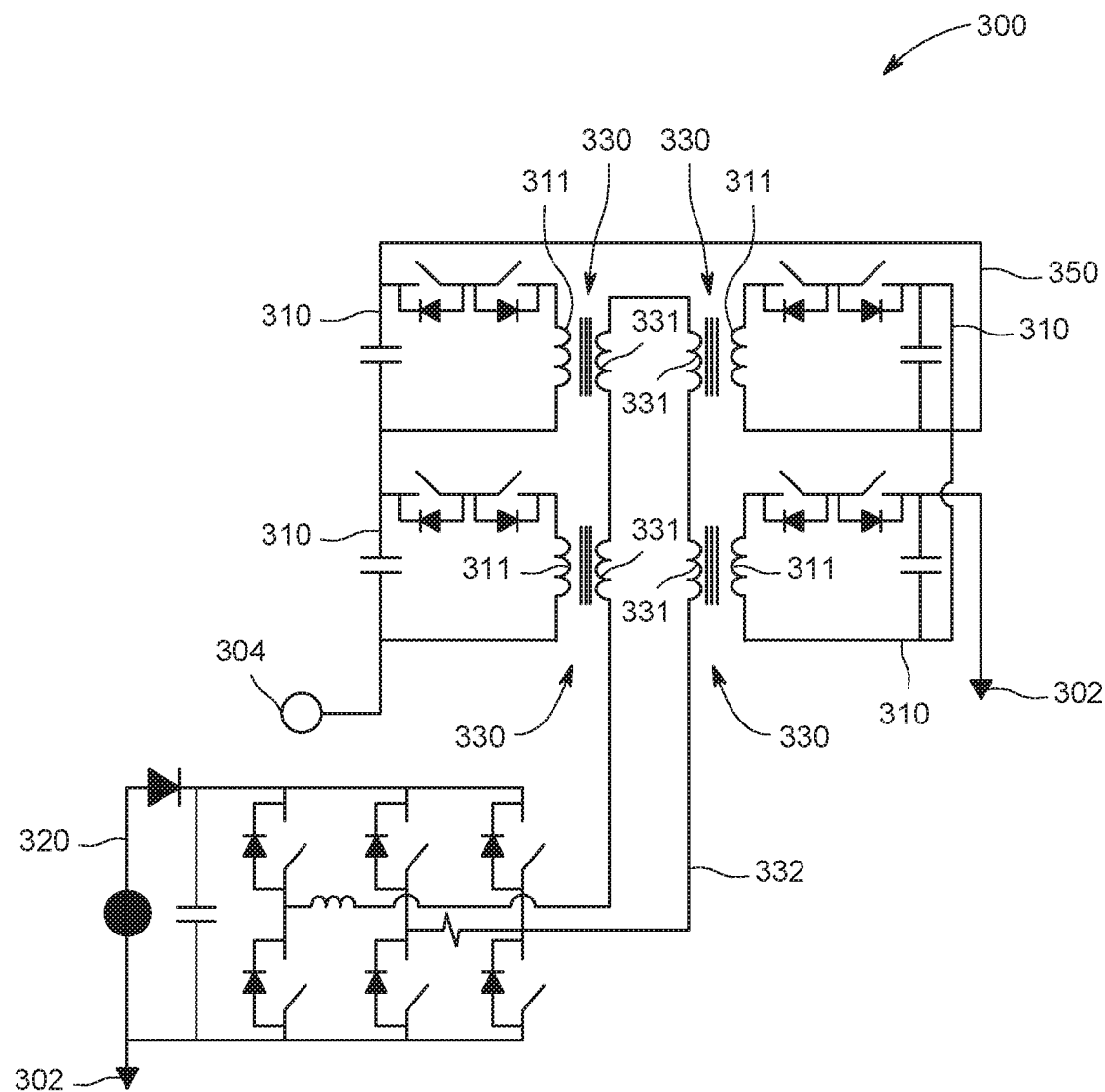
FIG. 3 is a schematic depiction of a voltage control circuit assembly in accordance with various embodiments.

It may be noted that while one transformer is shown in FIG. 1, additional transformers may be utilized in other embodiments. In some embodiments, plural transformers may be included as part of system or voltage control circuit assembly, with each transformer operably coupled to at least one voltage control module. For example, FIG. 3 depicts a voltage control circuit assembly 300 formed in accordance with various embodiments. The voltage control circuit assembly 300 includes voltage control modules 310 coupled to a connection 350 that extends from a common 302 to a target 304. The voltage control circuit assembly 300 also includes a low voltage circuit portion 320 coupled to the common 302. In the embodiment depicted in FIG. 3, the voltage control circuit assembly 300 includes four voltage control modules 310 and four transformers 330, each transformer 330 having a primary winding 331 that is wound about a magnetic core 332 and coupled to a secondary winding 311 of the corresponding voltage control module 310. It may be noted that other arrangements may be utilized in other embodiments. For example, plural transformers may be employed; however, more than one voltage control module may utilize a given transformer. It may be noted that FIG. 3 provides one example of a low voltage circuit portion, and that other arrangements may be employed for low voltage circuit portions in other embodiments.

With continued reference to FIGS. 1 and 2, in the illustrated embodiment, the on/off circuit portion 210 includes a switching unit 212 in series with an inductor 222 and a capacitor 224. The capacitor 224 may be understood as an auxiliary capacitance in the illustrated embodiment. In the illustrated embodiment, the switching unit 212 includes a first switch 218 in parallel with a first diode 214 and a second switch 220 in parallel with a second diode 216. Generally, the switching unit 212 may be controlled (e.g., by a controller or processor configured to control the voltage provided to the target) to control the transfer of energy between the on/off circuit portion 210 and the connection 150 and/or balancing circuit portion 230 to activate or deactivate a target receiving the voltage. For example, with particular reference to FIG. 2, to change a voltage provided by the voltage control circuit module 110 to the connection 150 from positive to negative, the second switch 220 may be closed, allowing current to flow through the second switch 220 and the first diode 214, and to transfer energy from the connection 150 and the balancing circuit portion 230 to the on/off circuit portion 210 for storage in the capacitor 224. The transfer of energy may be performed resonantly via the inductor 222. With continued reference to the voltage control module 110 depicted in FIG. 2, to change the voltage provided by the voltage control circuit module 110 to the connection 150 from negative to positive, the first switch 218 may be closed, allowing current to flow through the first switch 218 and the second diode 216, and to transfer energy from the capacitor 224 of the on/off circuit portion 210 to the connection 150 and the balancing circuit portion 230. It may be noted that the switching unit 212 may be controlled such that at least one of the first switch 218 and the second switch 220 are always open to prevent unregulated current flow in both directions. It may be noted that the switches may be controlled to pre-charge one or more capacitances. For example, the switches 218, 220, 248, 250 may be closed to charge the capacitor 234 and the capacitor 224 (or auxiliary capacitance) to a pre-set value which depends on the on-state value when an electron beam is on.

The depicted balancing circuit portion is coupled in parallel to the on/off circuit portion 210, and includes a capacitor 234 and a resistor 232. In the illustrated embodiment, the capacitor 234 and resistor 232 are coupled in parallel. (It may be noted that only a capacitor is shown for the balancing circuit portions of FIG. 1 for simplicity and ease of illustration.)

With continued reference to FIG. 2, the depicted fine-tuning circuit portion 240 includes a switching unit 242 in series with an inductor 252. The inductor 252 couples the voltage control module 110 to the transformer 130. The inductor 252 may be understood as a secondary winding of the transformer 130. In the illustrated embodiment, the switching unit 242 includes a first switch 248 in parallel with a first diode 244 and a second switch 250 in parallel with a second diode 256. Generally, the switching unit 242 may be controlled (e.g., by a controller or processor configured to control the voltage provided to the target) to control the transfer of energy between the fine tuning circuit portion 240 and the connection 150 and/or balancing circuit portion 230 to finely tune or adjust a voltage provided to a target, for example to adjust a focus or width of an electron beam. For example, with particular reference to FIG. 2, to increase a voltage provided by the voltage control circuit module 110 to the connection 150, the first switch 248 may be closed, allowing current to flow through the first switch 248 and the second diode 246, and to transfer energy to the connection 150 and the balancing circuit portion 230 (e.g., from the transformer 130 via the inductor 252). With continued reference to the voltage control module 110 depicted in FIG. 2, to reduce the voltage provided by the voltage control circuit module 110 to the connection 150 from negative to positive, the second switch 246 may be closed, allowing current to flow through the second switch 246 and the first diode 244, and to transfer energy from the connection 150 and the balancing circuit portion 230. It may be noted that the switching unit 242 may be controlled such that at least one of the first switch 248 and the second switch 250 are always open to prevent unregulated current flow in both directions. While the on/off circuit portion 210 may be controlled to change the voltage by a relatively large amount in a short amount of time in a single step, the fine tuning circuit portion 240 may be controlled to finely adjust the amount of voltage in a series of small steps which can vary in direction. For example, the switching unit 242 of the fine tuning circuit portion 240 may be controlled to vary the voltage based on voltage measured in the connection 150, and/or based on a measured dimension of an electron beam.

Figure 4:
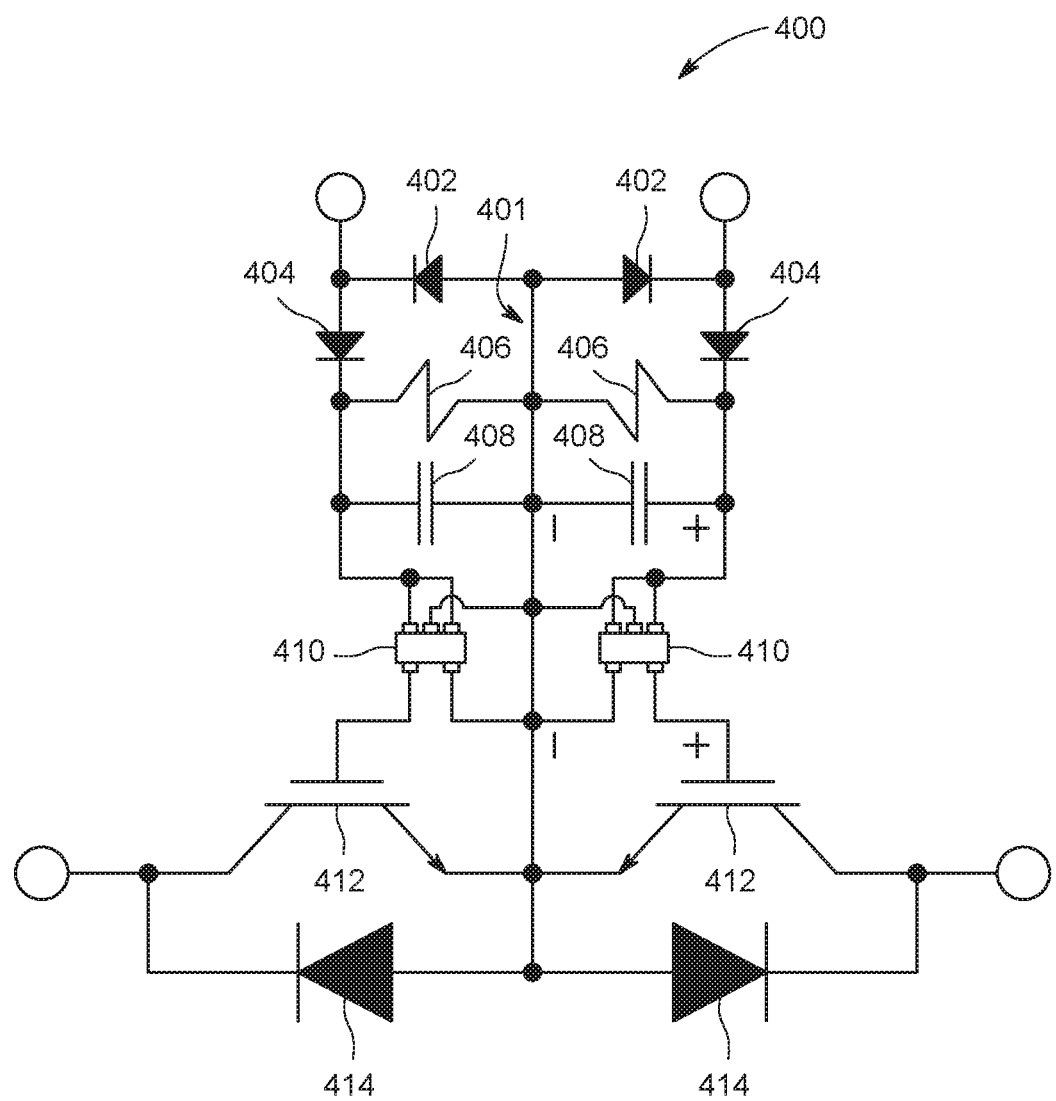
FIG. 4 depicts a gate drive assembly in accordance with various embodiments.

Accordingly, the on/off circuit portion 210 may be understood as utilizing one or more passive gate drives, while the fine tuning circuit portion 240 may be understood as using an active gate drive. It may be noted that passive componentry may be utilized to provide an effectively active gate drive for the fine tuning circuit portion 240 in various embodiments. An effectively active gate drive assembly as used herein may be understood as a gate drive assembly using passive components that provides a rate of voltage change over time sufficiently similar to an active gate drive to operate a gate for adjusting the voltage provided to a target by a fine tuning circuit portion. For example, FIG. 4 depicts a gate drive assembly 400 in accordance with various embodiments. The gate drive assembly 400 may be understood as an effectively active gate drive assembly as used herein. As seen in FIG. 4, the gate drive assembly 400 includes components generally symmetrically distributed about a central line 401. The gate drive assembly 400 includes first diodes 402, second diodes 404, resistors 406, capacitors 408, gate drives 410, transistors 412, and third diodes 414. The gate drives 410 in the illustrated embodiment have under voltage lockout (UVLO). Using such gate drives can provide the use of a small passive gate drive for the fine tuning circuit portion, which can result in a decrease footprint and/or increased reliability.

Returning to FIG. 1, the low voltage circuit portion 120 is coupled to the transformer 130 via a primary winding 129. The low voltage circuit portion 120 also includes at least one switching unit configured to control a voltage provided to the connection 150. For example, in the illustrated embodiment, the low voltage circuit portion 120 is coupled to the common 102, and includes a voltage source 122, a diode 124, a capacitor 126, a switching unit 128, and an inductor, or primary winding 129.

Figure 5:
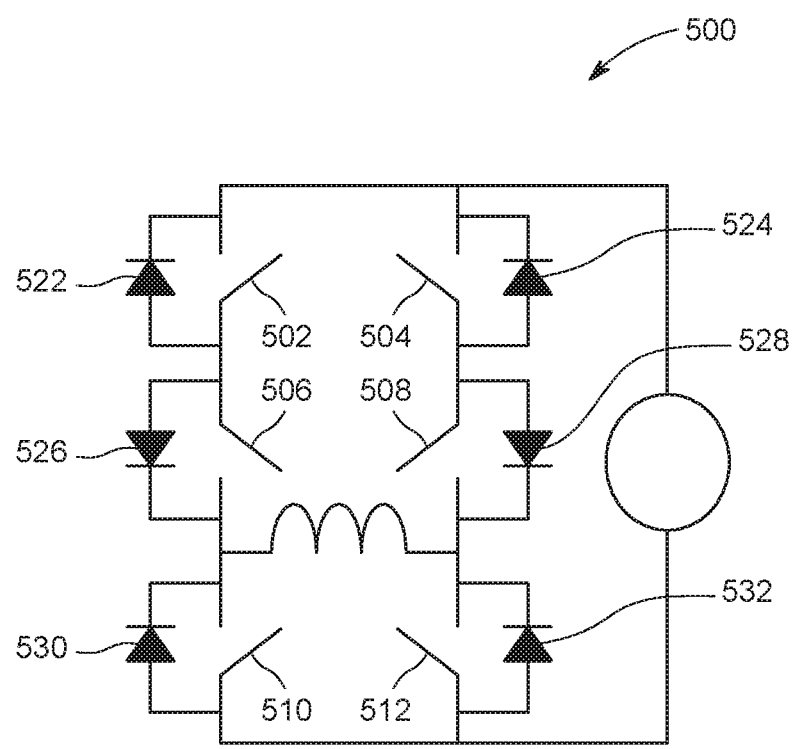
FIG. 5 depicts a schematic of a switching unit 500 formed in accordance with various embodiment.

FIG. 5 depicts a schematic of a switching unit 500 formed in accordance with various embodiments. The switching unit 500, or low voltage bridge, may be employed as the switching unit 128, for example. The switching unit 500 includes, arranged as shown in FIG. 5, a first switch 502, a second switch 504, a third switch 506, a fourth switch 508, a fifth switch 510, a sixth switch 512, and corresponding first diode 522, second diode 524, third diode 526, fourth diode 528, fifth diode 530, and sixth diode 532, respectively. The switching unit 500 is coupled to inductor 550, which may be the primary winding of a transformer (e.g., transformer 130). The first switch 502, a second switch 504, a third switch 506, a fourth switch 508, as arranged in FIG. 5, may be utilized to block voltage in either direction or to conduct current in either direction.

In various embodiments, the low voltage circuit portion 120 and voltage control modules 110 depicted in FIG. 1 may be utilized to control the provision of voltage to a first, or primary electrode, while additional components are used to control the provision of voltage to a secondary electrode. For example, in some embodiments, the circuit assembly 100 may also include secondary voltage control modules operably coupled to the connection 150 (e.g., to a separate conductor or wire of the connection 150 from the voltage control modules 110), with the secondary voltage control modules configured to control voltage delivered to a secondary target, such as a secondary electrode. For example, in some embodiments, the voltage provided to a primary electrode by the voltage control modules 110 may control a first dimension of an electron beam in a first direction (as well as activate and deactivate the electron beam), while the secondary voltage provided to the secondary X-ray electrode controls a second dimension of the electron beam in a second direction that is oriented perpendicularly to the first direction.

Figure 6:
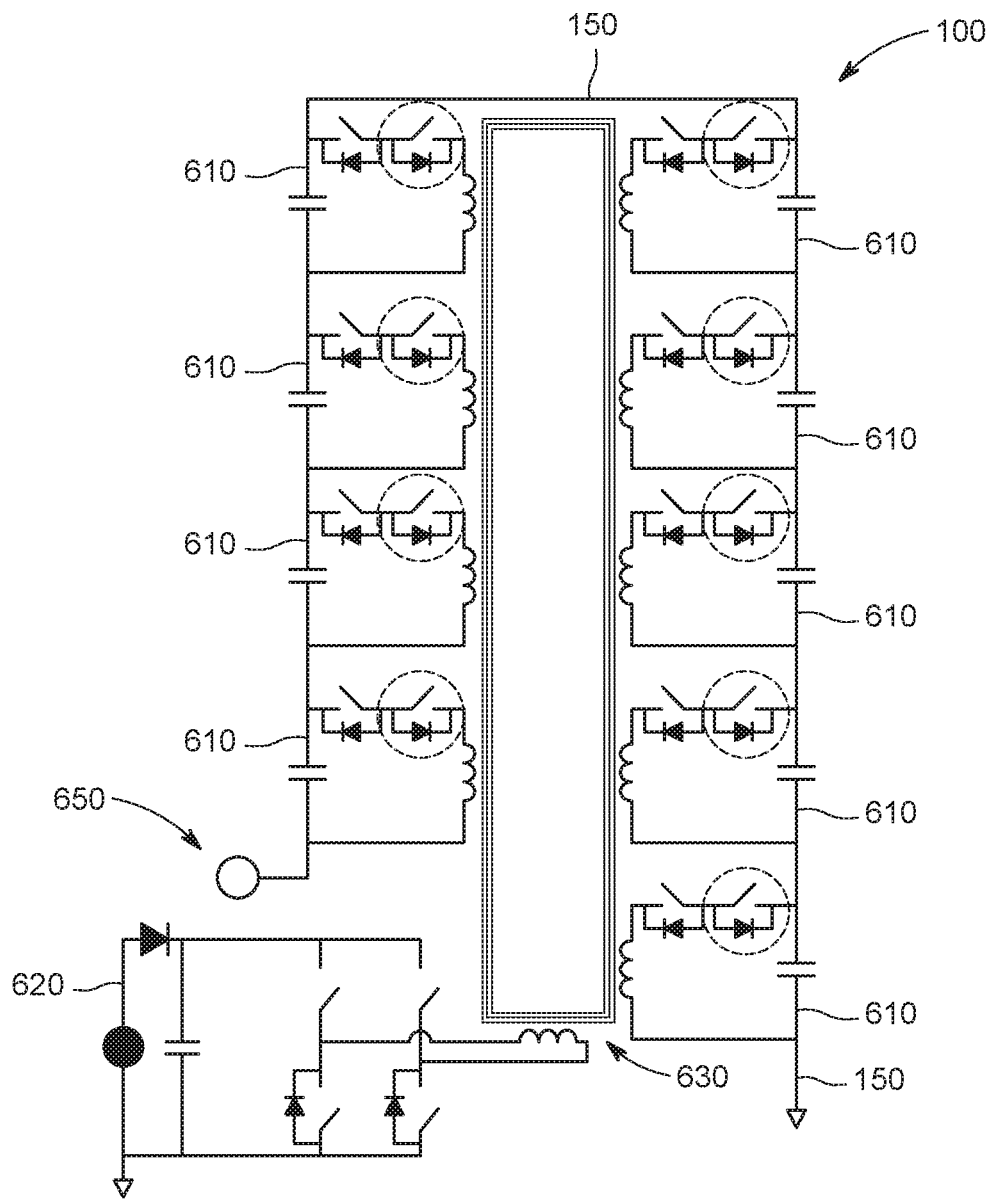
FIG. 6 is a schematic depiction of an additional portion of the circuit assembly of FIG. 1 for controlling a secondary voltage provided to the connection in accordance with various embodiments.

FIG. 6 is a schematic depiction of an additional portion of the circuit assembly 100 for controlling a secondary voltage provided to the cable in accordance with various embodiments. It may be noted that the components depicted in FIG. 6 may be generally similar to the components depicted in FIG. 1; however, the on/off circuit portions of the voltage modules may be omitted for the portion depicted in FIG. 6, which may be used to adjust a voltage for focusing an electron beam. As seen in FIG. 6, the depicted circuit assembly 100, in addition to including the voltage control modules 110 of FIG. 1, may also include secondary voltage control modules 610 coupled to the connection 150, as well as a low voltage circuit portion 620 and a transformer 630. The low voltage circuit portion 620 and the transformer 630, for example, may be generally similar to the low voltage circuit portion 120 and the transformer 130, respectively. The portion of the circuit assembly 100 depicted in FIG. 6 may be coupled to a target 650. The target 650, for example, may be a second conductor of a cable for which a first conductor is represented by the target 104. The signal provided via the target 104 may be used to focus an electron beam in a first direction, and the signal provided via the target 650 may be used to focus the electron beam in a second direction.

Further, with reference to FIG. 2, the secondary voltage control modules 610 may be generally similar to the voltage control modules 110, but not include the on/off circuit portion 210. Accordingly, as seen in FIG. 2, an example secondary voltage control module 610 may include the balancing circuit portion 230 and the fine tuning circuit portion 240, but not the on/off circuit portion 210. The secondary voltage control modules 610 may be used to control voltage provided to a secondary electrode as discussed herein.

Figure 7:
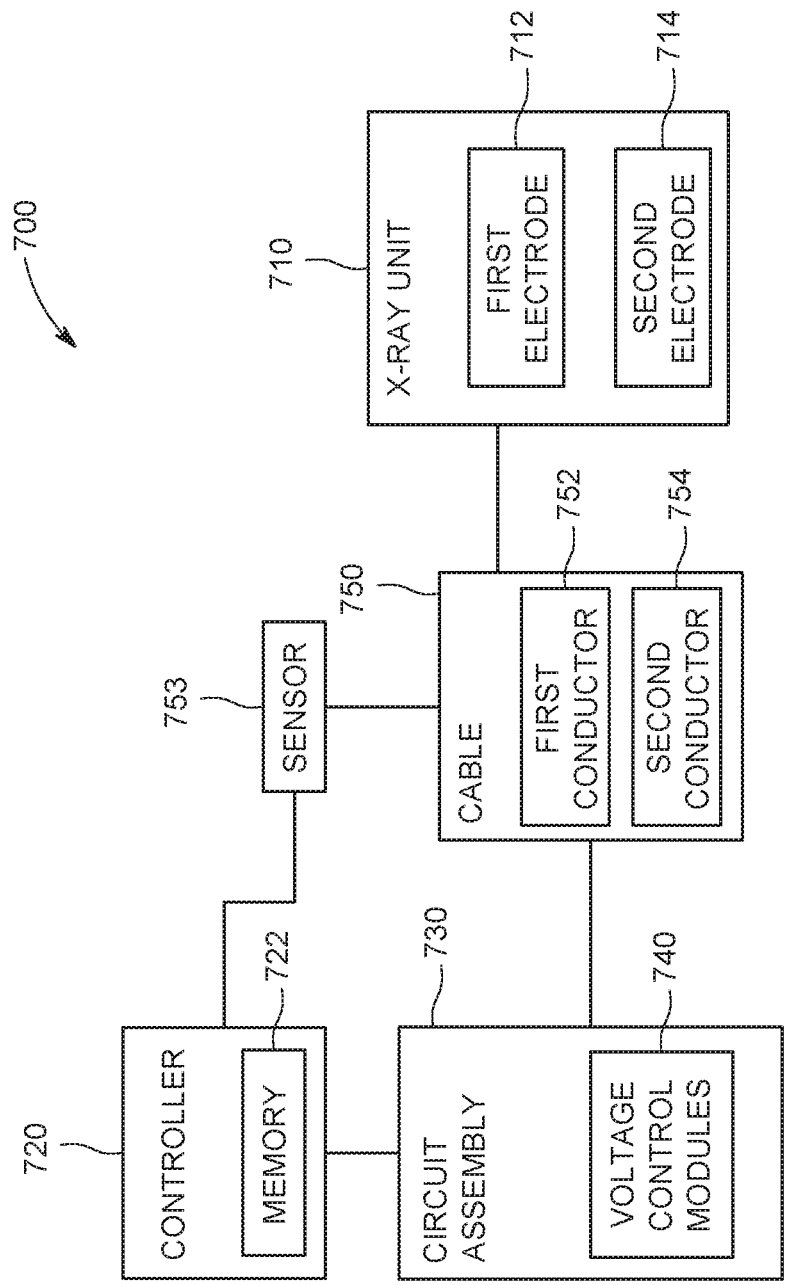
FIG. 7 is a schematic depiction of an X-ray system in accordance with various embodiments.

FIG. 7 is a schematic depiction of a system 700 in accordance with various embodiments. As seen in FIG. 7, the depicted system 700 includes an X-ray unit 710, a controller 720, a circuit assembly 730 including plural voltage control modules 740, and a cable 750. It may be noted that, for example, the cable 750 in various embodiments may be coupled to the circuit assembly 730 at a connection point located similarly to target 104 in FIG. 1. Generally, the controller 720 is operably coupled to circuitry (e.g., circuit assembly 100), and utilizes the voltage control modules 730 for providing a desired voltage (or voltages) to the X-ray unit 710 via the cable 750.

In the illustrated embodiment, the X-ray unit 710 includes a first electrode 712, and a second electrode 714. A voltage provided to the first electrode 712 activates (or de-activates) the X-ray unit 710, as well as focuses or controls a dimension of a produced electron beam in a first direction. A secondary voltage provided to the second electrode 714 focuses or controls a second dimension of the produced electron beam in a second direction. The second direction may be perpendicular to the first direction.

The controller 720 is configured to control various aspects of the system 100, including the provision of voltage to control the X-ray unit 710, for example by controlling the voltage control modules 740 of the circuit assembly 730. For example, based on a sensed voltage in the cable 750 measured with sensor 753, the controller 720 may adjust a voltage provided to the X-ray unit 710 by controlling switching units of one or more fine tuning circuit portions of the voltage control modules 740. The controller 720 may include processing circuitry configured to perform one or more tasks, functions, or steps discussed herein. It may be noted that "controller" as used herein is not intended to necessarily be limited to a single processor or computer. For example, the controller 720 may include multiple processors and/or computers, which may be integrated in a common housing or unit, or which may distributed among various units or housings.

In the illustrated embodiment, the controller 720 includes a memory 722 which includes a tangible and non-transitory computer readable medium. It may be noted that the memory 722 may have stored thereon instructions for directing the controller 720 to perform one or more aspects of the methods, steps, or processes discussed herein. In various embodiments, the controller 720 may control individual voltage control modules and/or a group or groups of voltage control modules simultaneously to control the total delivered voltage. For example, the controller 720 may actuate switching portions of all or most of the modules to provide a large voltage change to turn an electrode on and off, and may control one or more of the modules for fine tuning of voltage to focus an electron beam.

The circuit assembly 730 may be generally similar in various respects to the circuit assembly 100 discussed herein. For example, the voltage control modules may include one set of primary voltage control modules similar to voltage control modules 110 and one set of secondary voltage control modules generally similar to voltage control modules 610.

The cable 750 operably connects the circuit assembly 730 and the X-ray unit 710. For example, a first conductor 752 of the cable 750 may be operably coupled to a first group of primary voltage control modules and to the first electrode 712. A second conductor 754 of the cable 750 may be operably coupled to a second group of secondary voltage control modules and to the second electrode 714. Voltage provided via the first conductor 752 may be utilized to turn the X-ray unit 710 on and off and to control focus of the electron beam in a first direction, while voltage provided via the second conductor 714 may be used to focus the electron beam in a second direction.

In various embodiments, redundancy may be provided for improved reliability. For example, in some embodiments, plural low voltage circuit portions may be utilized, with each low voltage circuit portion coupled to a group of voltage control modules and configured to control a voltage provided to the corresponding group of voltage control modules from a given low voltage circuit portion. Alternatively or additionally, plural transformers may be utilized, with each transformer operably coupled to at least one corresponding voltage control module. In some embodiments, a given transformer and a corresponding low voltage circuit portion may be coupled to a corresponding low voltage circuit portion. For example, FIG. 8 is a schematic depiction of a circuit assembly 800 for controlling voltage provided to a cable 850 in accordance with various embodiments.

Figure 8:
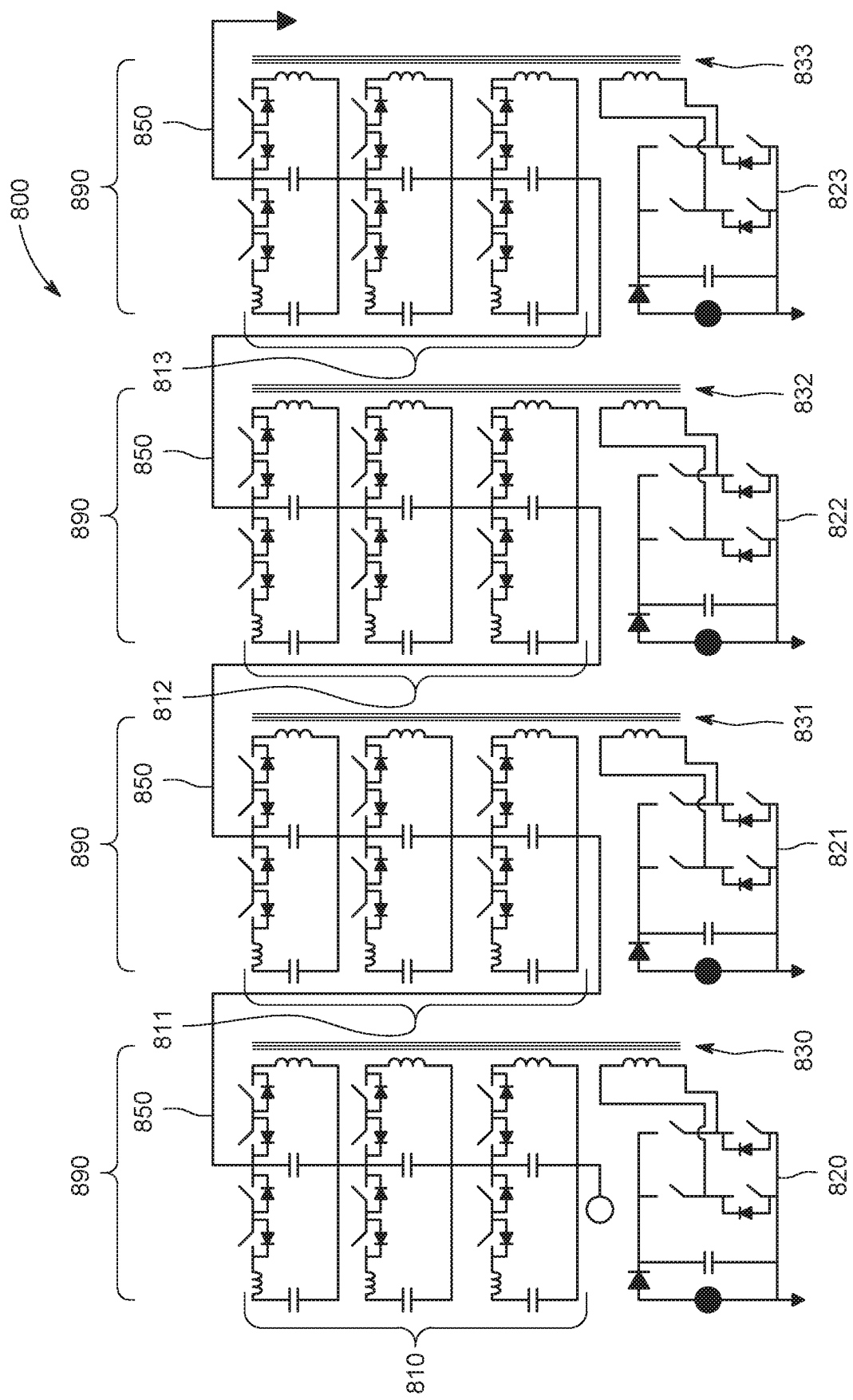
FIG. 8 is a schematic depiction of a circuit assembly for controlling voltage provided to a connection in accordance with various embodiments.

As seen in FIG. 8, the depicted circuit assembly 800 includes a first low voltage circuit portion 820 that is coupled to a first transformer 830. The first low voltage circuit portion 820 and first transformer 830 are operably coupled to a first group 810 of three voltage control modules. The circuit assembly 800 also includes a second low voltage circuit portion 821 that is coupled to a second transformer 831. The second low voltage circuit portion 821 and second transformer 831 are operably coupled to a second group 811 of three voltage control modules. Also, the circuit assembly 800 also includes a third low voltage circuit portion 822 that is coupled to a third transformer 832. The third low voltage circuit portion 822 and third transformer 832 are operably coupled to a third group 812 of three voltage control modules. Further, the circuit assembly 800 also includes a fourth low voltage circuit portion 823 that is coupled to a fourth transformer 833. The fourth low voltage circuit portion 823 and fourth transformer 833 are operably coupled to a fourth group 813 of three voltage control modules. Generally, the low voltage circuit portions may be generally similar in various respects to the low voltage circuit portion 120, the transformers may be generally similar in various respects to the transformer 130, and the low voltage modules may be generally similar in various respects to the low voltage modules 110 (or low voltage modules 610). By using redundant groups of components as shown in FIG. 8, increased reliability may be provided while still maintaining the overall number of components at a reasonable level. For example, if 9 voltage control modules are required to provide a desired voltage, 9 of 12 in the illustrated embodiment will still be functional if a single low voltage circuit portion or transformer fails. It may be noted that the number of groups and number of particular components associated with each group are provided by way of example for illustrative purposes, and that other numbers and/or arrangements of redundant groups of components may be used in different embodiments.

It may be noted that each corresponding group of voltage circuit modules, low voltage circuit portion, and transformer may be considered as a repeating unit 890. In the illustrated embodiment, there are four repeating units 890 depicted; however, more or less repeating units 890 may be provided in various embodiments. Also, each repeating unit 890 in the illustrated embodiment includes three voltage control modules; however, more or less voltage control modules may be utilized in repeating units 890 in other embodiments.

Figure 9:
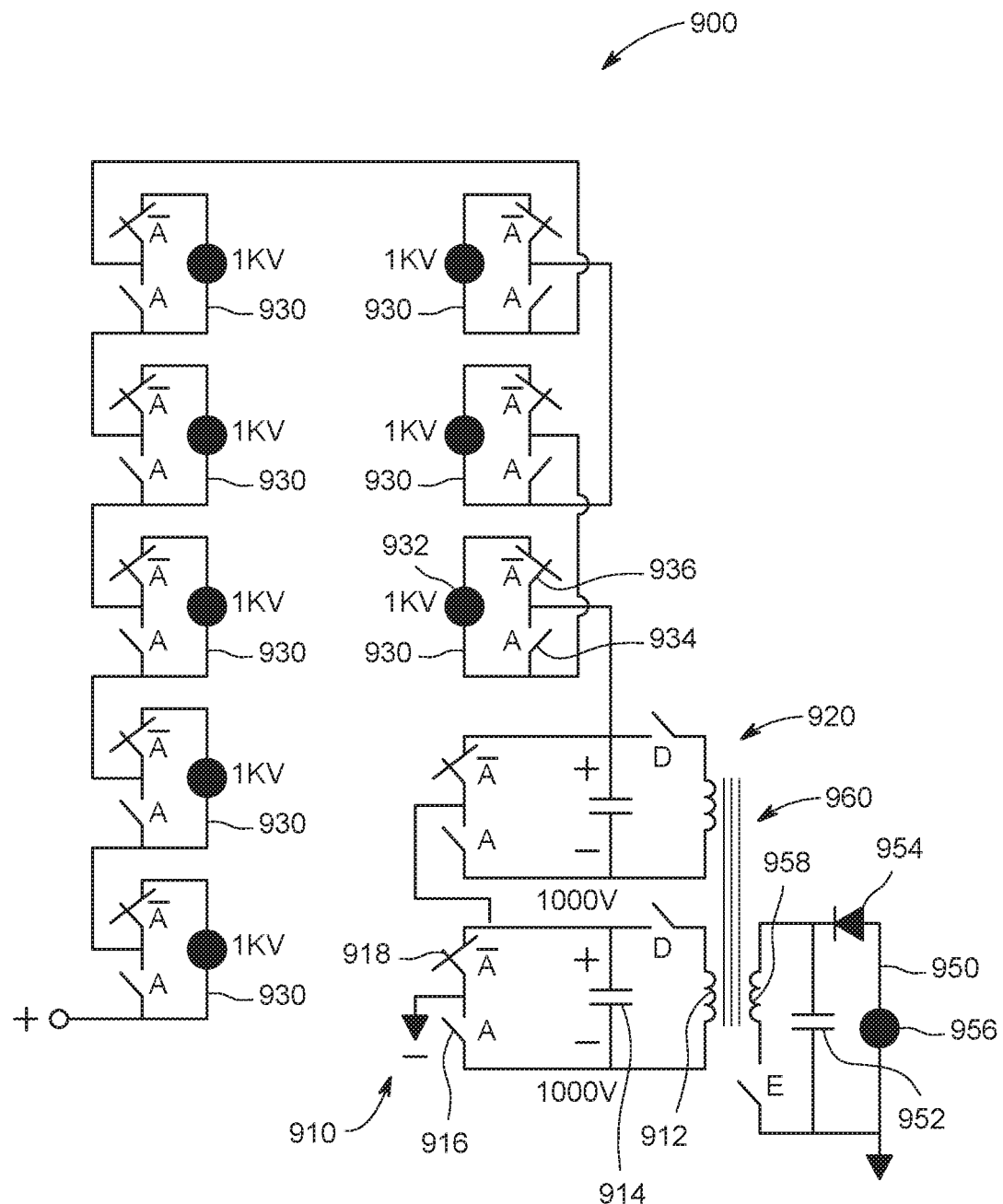
FIG. 9 is a schematic depiction of a circuit assembly for controlling voltage provided to a connection in accordance with various embodiments.

It may be noted that the particular voltage control modules and/or low voltage circuit portions, for example, are provided by way of example, and that other arrangements may be utilized in various embodiments. For example, various circuit portions may be coupled to a cable in stages, including a series of voltage control modules. FIG. 9 is a schematic depiction of a circuit assembly 900 for controlling voltage provided to a cable in accordance with various embodiments. The circuit assembly 900 includes biasing stages 910 and 920, as well as voltage control modules 930. In the illustrated embodiments, each voltage control module 930 is configured to provide up to 1 kV for a total combined voltage of 8 kV, as there are eight total voltage control modules 930.

A transformer couples biasing stages 910 and 920 with circuit portion 950, which includes a capacitor 952, a diode 954, a voltage source 956, and an inductor 958, with the inductor 958 configured as a winding of transformer 960. The biasing stages 910 and 920 each include an inductor 912, capacitor 914, switch 916 and switch 918. The biasing stages 910 and 920 may be used for fine tuning (e.g., to provide a total voltage that is not a whole number of kV).

Also, each voltage control module includes a voltage source 932 (1 kV in the illustrated example), first switch 934, and second switch 936. By opening the first switch 934 (shown closed in the illustrated embodiment) and closing the second switch 936, the voltage sources 932 may be bypassed and a capacitance engaged. The 1 kV stages (or voltage control modules) may be turned on (or off) with some delay, which may reduce losses. In alternative embodiments, a switch may be connected with one or more SIDACs in series.

3 different logic signals may be employed in connection with the circuit assembly 900. Namely, signal A may be utilized to apply −8 kV to turn an electron beam off (It may be noted that other voltage values may be utilized in other embodiments.) It may also be noted that signals A may be delayed with hardware. Signal A (when A=0) can also bypass the capacitance when −8 kV is applied, or (when A=1) engage the capacitance when positive bias is desired. Signal D discharges the capacitance to a desired value, while Signal E charges the capacitance to a desired value. It may be noted that the embodiment of FIG. 9 may be better suited for relatively shorter cable lengths, but not relatively longer cable lengths.

Figure 10:
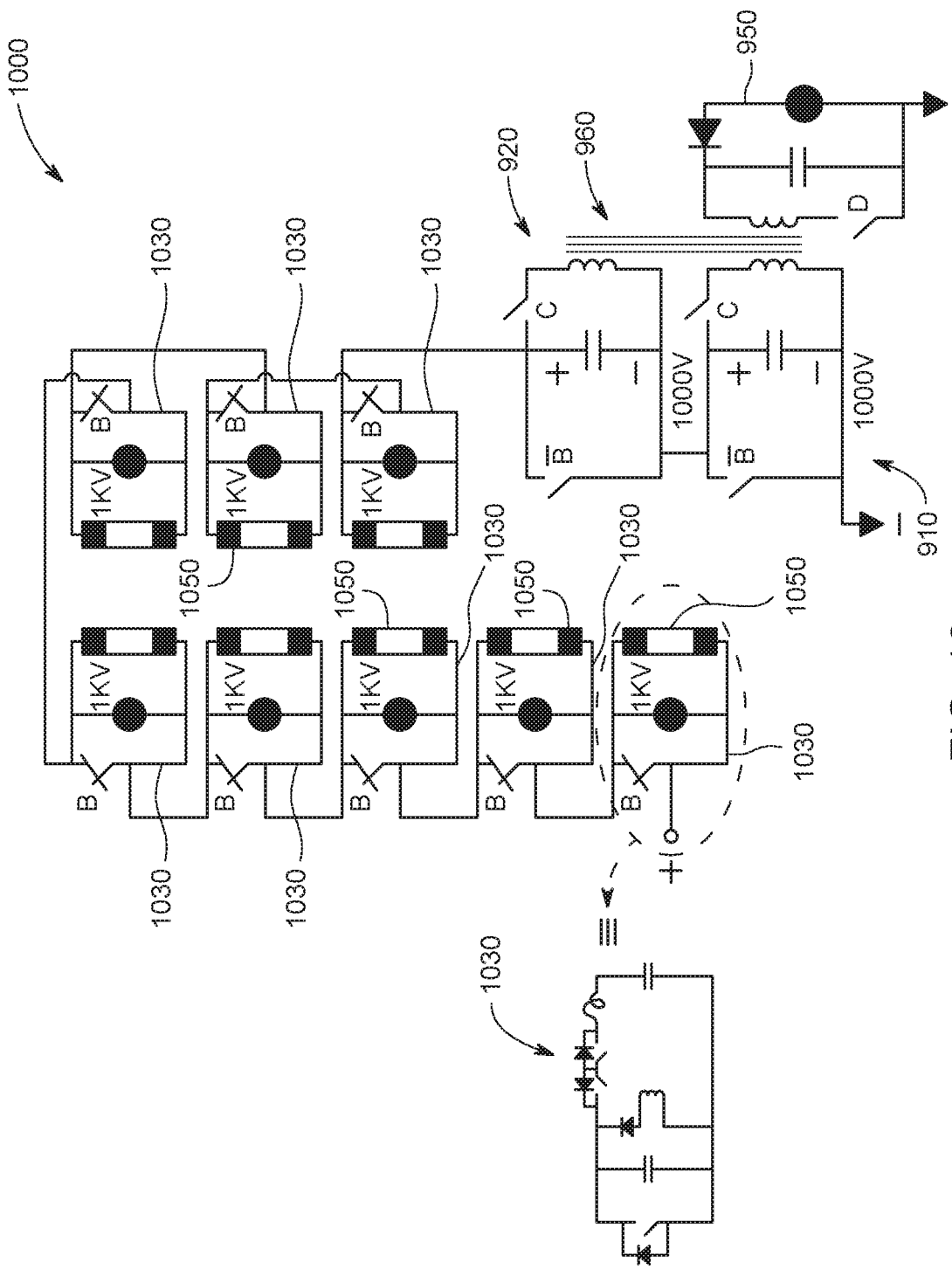
FIG. 10 is a schematic depiction of a circuit assembly for controlling voltage provided to a connection in accordance with various embodiments.

FIG. 10 is a schematic depiction of a circuit assembly 1000 for controlling voltage provided to a cable in accordance with various embodiments. The circuit assembly 1000 may be generally similar to the circuit assembly 900 in certain respects, with aspects of FIG. 10 corresponding to the like numbered aspects of FIG. 9. For example, the circuit assembly 1000 includes biasing stages 910 and 920, as well as voltage control modules 1030. In the illustrated embodiments, each voltage control module 1030 is configured to provide up to 1 kV for a total combined voltage of 8 kV, as there are eight total voltage control modules 1030. However, in FIG. 10, a recovery circuit portion 1050 is included in each voltage control module 1030. The recovery unit 1050 in some embodiments may recover energy only when a negative voltage exists.

In the illustrated embodiment, four logic signals may be employed to control the circuit assembly 1000. A first signal, for example, may be utilized to control the recovery circuit portion 1050. Signal B, when active (B=1) may provide a low impedance, and may provide −8 kV when (B=0). Signal C discharges the capacitance to a desired value, and Signal D charges the capacitance to a desired value. It may be noted that if the positive voltage is kept small enough, the embodiment of FIG. 10 may be utilized in connection with a relatively long cable.

It may be noted that, for the embodiment depicted in FIG. 1, each module may be controlled to produce ⅛ of a desired voltage. However, for the embodiments depicted in FIGS. 9 and 10, a different approach may be employed. For example, if each voltage control module of FIG. 9 or FIG. 10 provides 1 kV, a given number of voltage control modules may be employed to provide a desired voltage level that is a whole number of kV. For example, if 7 kV is desired, 7 voltage control modules may be activated, with any remaining voltage control modules bypassed or deactivated, and with the fine tuning portions (e.g., biasing stages 910, 920) deactivated or bypassed. However, if a total voltage that is not a whole number is desired, the biasing stages 910, 920 may be used to provide fine-tuning. For example, if 7.5 kV is desired, 7 voltage control modules may be activated to provide 7 kV, and the biasing stages 910, 920 regulated to provide 250 volts each, for a total of 7.5 kV.

It may be noted that the deactivation or bypass procedure for the embodiments depicted in FIGS. 9 and 10 differ from each other. For example, in FIG. 9, a bypassed voltage control module remains charged but is bypassed. In contrast, in FIG. 10, to bypass a voltage control module, energy is moved to an auxiliary capacitance. Generally speaking, the embodiment of FIG. 10 has lower energy losses compared to the embodiment depicted in FIG. 9, but increased complexity.

Figure 11:
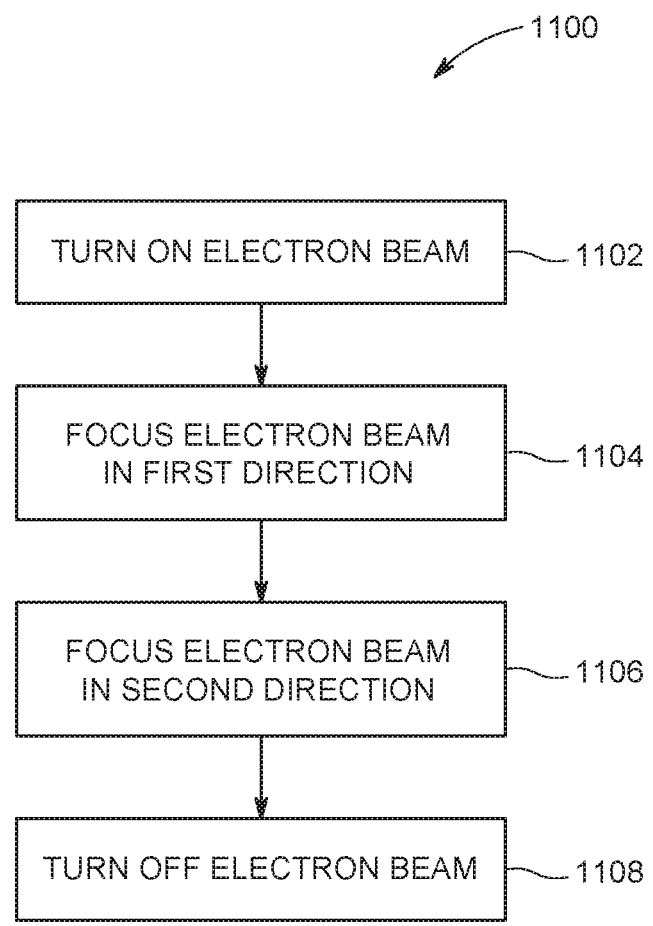
FIG. 11 is a flowchart of a method in accordance with various embodiments.

FIG. 11 illustrates a flowchart of one embodiment of a method 1100 for providing voltage to a target, such as one or more X-ray electrodes. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. The method 1100 may be performed by one or more embodiments of the various systems and/or circuits described herein.

At 1102, an electron beam is turned on by switching a voltage applied to an X-ray unit by a sufficiently large amount (e.g., several kilovolts) within a sufficiently short amount of time (e.g., 50 microseconds). The voltage may be provided to the electrode via a cable to which a series of voltage control modules as described herein are inductively coupled, for example. In various embodiments a series of primary voltage control modules may be coupled to a first conductor of a cable, and a series of secondary voltage control module may be coupled to a second conductor of the cable. The primary voltage control modules may be utilized to turn the X-ray unit on, for example by controlling the switching units of on/off circuit portions of the primary voltage control modules.

At 1104, the electron beam is focused in a first direction. For example, fine tuning portions of the primary voltage control modules may be utilized to adjust the voltage provided to a primary electrode of the X-ray unit to control the dimension of the electron beam in the first direction.

At 1106, the electron beam is focused in a second direction, for example in a second direction that is perpendicular to the first direction. For example, fine tuning portions of the secondary voltage control modules may be utilized to adjust the voltage provided to a secondary electrode of the X-ray unit to control the dimension of the electron beam in the second direction. It may be noted that in various embodiments, the focusing at 1106 may occur at the same time as the focusing at 1104, at an earlier time than the focusing at 1104, or at a later time than the focusing at 1104.

At 1108, with a scan or portion thereof completed, the electron beam is turned off by switching a voltage applied to an X-ray unit by a sufficiently large amount (e.g., several kilovolts) within a sufficiently short amount of time (e.g., 50 microseconds) in the opposite direction of the voltage used to turn the X-ray unit on at 1102. The primary voltage control modules may be utilized to turn the X-ray unit off, for example by controlling the switching units of on/off circuit portions of the primary voltage control modules.

Figure 12:
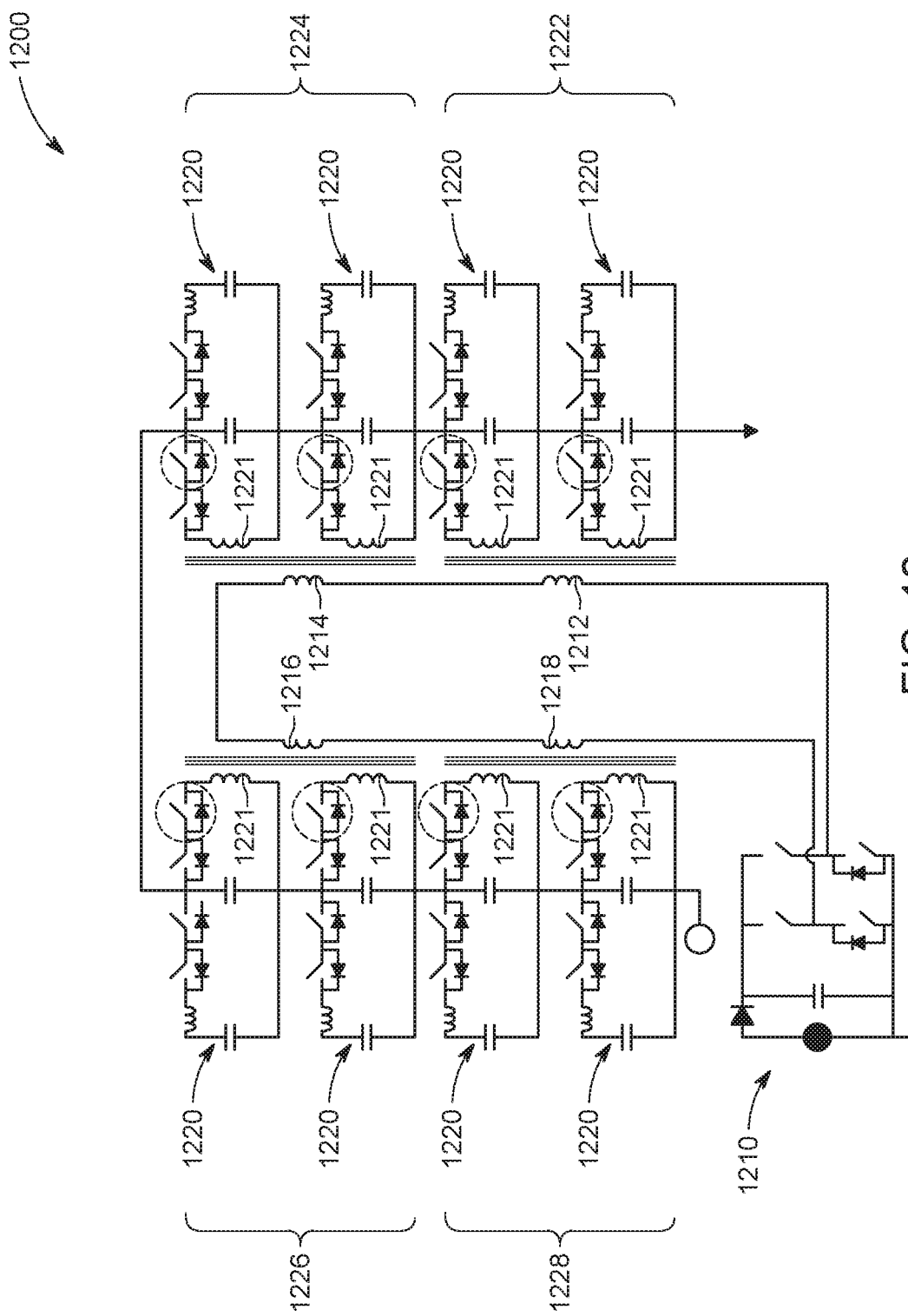
FIG. 12 is a schematic depiction of a circuit assembly for controlling voltage provided to a connection in accordance with various embodiments.

It may be noted, for example, that the embodiment depicted in FIG. 1 includes one primary (on the low voltage side) and 9 secondaries (on the high voltage side). Other numbers or arrangements of primaries and secondaries may be employed in various embodiments. For example, in some embodiments, a ratio of two (or three, or other) secondaries per primary may be employed. In various embodiments, the ratio of secondaries to primaries may be selected, for example, based on available space (both amount of space and location or locations available) on a board. FIG. 12 depicts a circuit assembly 1200. The circuit assembly 1200 may be generally similar in various respects to the circuit assembly 100, but has two secondaries per primary. As seen in FIG. 12, the circuit assembly 1200 includes a low voltage circuit portion 1210 that is coupled with four primaries (a first primary 1212, a second primary 1214, a third primary 1214, and a fourth primary 1216) connected in series. The circuit assembly 1200 also includes eight voltage control modules 1220 (with each voltage control module including a secondary 1221) arranged in groups of two (a first group 1222, a second group 1224, a third group 1226, and a fourth group 1228). The first group 1222 is coupled with the first primary 1212, the second group 1224 is coupled with the second primary 1214, the third group 1226 is coupled with the third primary 1216, and the fourth group 1228 is coupled with the fourth primary 1218.

Figure 13:
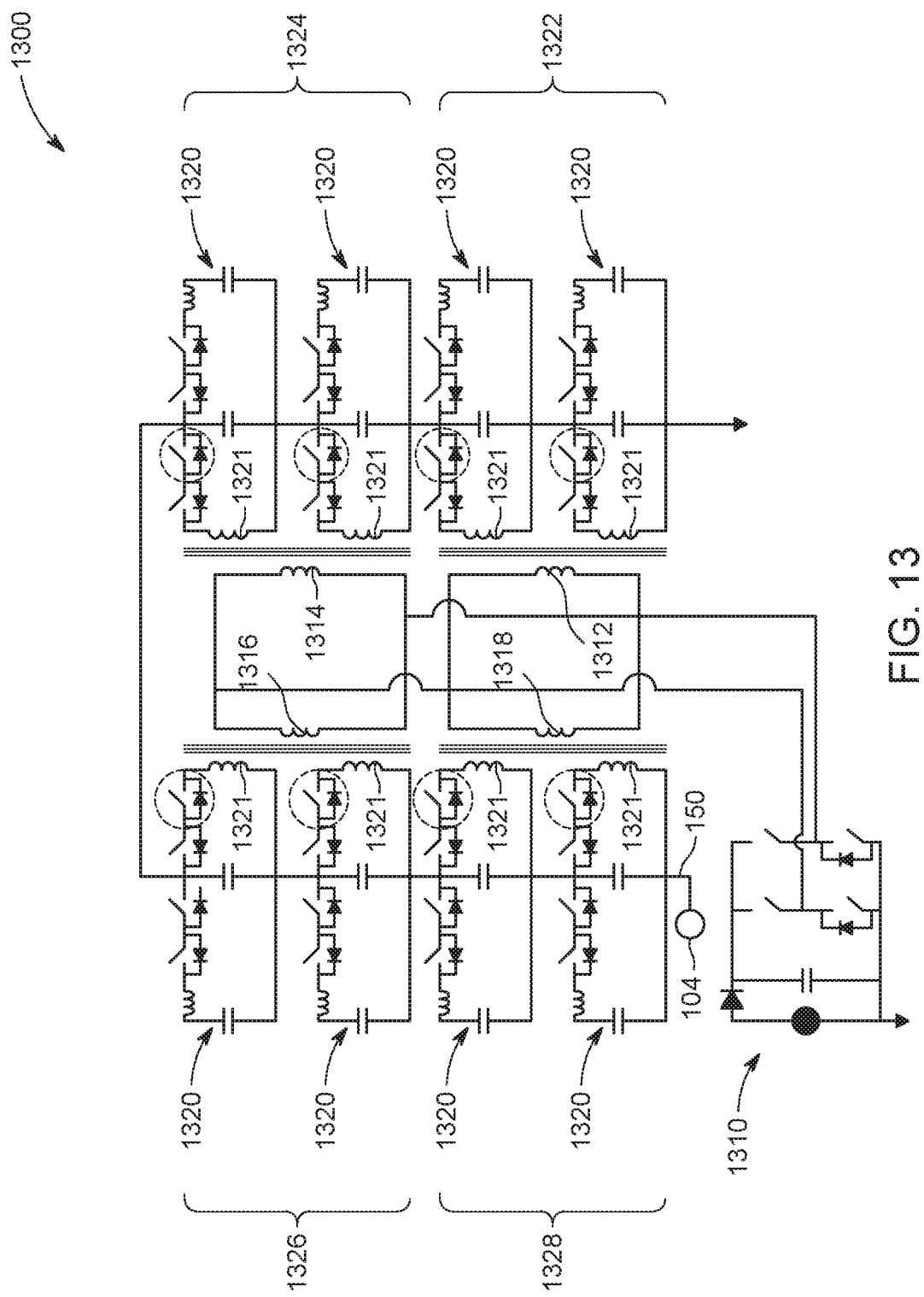
FIG. 13 is a schematic depiction of a circuit assembly for controlling voltage provided to a connection in accordance with various embodiments.

As another example, FIG. 13 depicts a circuit assembly 1300. The circuit assembly 1300 may be generally similar in various respects to the circuit assembly 100, but has two secondaries per primary. The circuit assembly 1300 may also be generally similar in various respects to the circuit assembly 1200; however the primaries of the circuit assembly 1300 are connected in parallel. As seen in FIG. 13, the circuit assembly 1300 includes a low voltage circuit portion 1310 that is coupled with four primaries (a first primary 1312, a second primary 1314, a third primary 1314, and a fourth primary 1316) connected in parallel. The circuit assembly 1300 also includes eight voltage control modules 1320 (with each voltage control module including a secondary 1321) arranged in groups of two (a first group 1322, a second group 1324, a third group 1326, and a fourth group 1328). The first group 1322 is coupled with the first primary 1312, the second group 1324 is coupled with the second primary 1314, the third group 1326 is coupled with the third primary 1316, and the fourth group 1328 is coupled with the fourth primary 1318.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. The various embodiments are not limited to the arrangements and instrumentality shown in the drawings.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A circuit assembly comprising:
    a plurality of voltage control modules coupled to each other in series and configured to control voltage delivered to an X-ray electrode, each voltage module comprising:
        an on/off circuit portion configured to provide a voltage for activating or deactivating the X-ray electrode;
        a balancing circuit portion coupled in parallel to the on/off circuit portion, the balancing portion comprising a capacitor and a resistor coupled in parallel;
        a tuning circuit portion coupled in parallel to the balancing circuit portion and the on/off circuit portion, the tuning circuit portion configured to adjust a voltage provided to the X-ray electrode;
        wherein the on/off circuit portion comprises a switching unit having a first switch and a second switch connected in series with an inductor and a capacitor; and
    wherein the circuit assembly further includes a controller configured to control the switching unit such that at least one of the first switch or the second switch is always open.

2. The circuit assembly of claim 1, further comprising at least one transformer coupled via a secondary conductive winding to each tuning circuit portion of each voltage control module.

3. The circuit assembly of claim 1, wherein the first switch and the second switch are connected in series with each other in an opposite direction.

4. The circuit assembly of claim 1, wherein the controller is further configured to close the second switch and open the first switch in order to change the voltage delivered to the X-ray electrode from positive to negative.

5. The circuit assembly of claim 1, wherein the on/off circuit portion includes a passive gate driver and the tuning circuit portion includes an active gate driver.

6. The circuit assembly of claim 2, further comprising at least one low voltage circuit portion coupled to the at least one transformer via a primary winding, the at least one low voltage circuit portion comprising at least one switching unit configured to control voltage provided to the primary winding.

7. The circuit assembly of claim 2, wherein the tuning circuit portion comprises a switching unit in series with an inductor, wherein the inductor inductively couples the voltage control module to the at least one transformer.

8. A system comprising:
    at least one X-ray electrode;
    at least one controller configured to control at least one voltage provided to the at least one X-ray electrode;
    a plurality of voltage control modules coupled to each other in series and configured to control the at least one voltage delivered to the at least one X-ray electrode;
    wherein each voltage control module comprises:
        an on/off circuit portion configured to provide a voltage for activating or deactivating the at least one X-ray electrode;
        a balancing circuit portion coupled in parallel to the on/off circuit portion, the balancing portion comprising a capacitor and a resistor coupled in parallel;
        a tuning circuit portion coupled in parallel to the balancing circuit portion and the on/off circuit portion, the tuning circuit portion configured to adjust the at least one voltage provided to the at least one X-ray electrode;
    wherein the on/off circuit portion comprises a switching unit having a first switch and a second switch connected in series with an inductor and a capacitor; and
    wherein the at least one controller is further configured to control the switching unit such that at least one of the first switch or the second switch is always open.

9. The system of claim 8, further comprising at least one transformer, the at least one transformer coupled via a secondary winding to each tuning circuit portion of each voltage control module.

10. The system of claim 9, further comprising at least one low voltage circuit portion coupled to the at least one transformer via a primary winding, the at least one low voltage circuit portion comprising at least one switching unit configured to control voltage provided to the primary winding.

11. The system of claim 9, wherein the tuning circuit portion comprises a switching unit in series with an inductor, wherein the inductor inductively couples the voltage control module to the at least one transformer.

* * * * *